United States Patent [19]
Ellis

[11] 3,980,097
[45] Sept. 14, 1976

[54] FIRE HYDRANT WITH DRAIN VALVE AND BACKFLOW PREVENTER MECHANISM

[75] Inventor: Daniel A. Ellis, Decatur, Ill.

[73] Assignee: Mueller Co., Decatur, Ill.

[22] Filed: July 29, 1975

[21] Appl. No.: 600,193

[52] U.S. Cl. ............................... 137/283; 137/307; 137/516.11; 137/854; 137/614.2
[51] Int. Cl.² ............................................. E03B 9/14
[58] Field of Search ................. 137/272, 281–285, 137/294, 301–308, 614.2

[56] References Cited
UNITED STATES PATENTS

| | | | |
|---|---|---|---|
| 2,571,893 | 10/1951 | Kendall | 137/525 X |
| 2,579,855 | 12/1951 | Pockel et al. | 137/525 |
| 3,185,171 | 5/1965 | Mueller et al. | 137/283 |
| 3,506,027 | 4/1970 | Dunton | 137/307 |

FOREIGN PATENTS OR APPLICATIONS

| | | | |
|---|---|---|---|
| 1,124,014 | 6/1956 | France | 137/301 |
| 641,191 | 10/1932 | Germany | 137/307 |

*Primary Examiner*—Martin P. Schwadron
*Assistant Examiner*—Richard Gerard
*Attorney, Agent, or Firm*—Cushman, Darby & Cushman

[57] ABSTRACT

A fire hydrant of the "dry" barrel type having an improved means of draining the barrel after the hydrant has been used and the main hydrant valve closed. The hydrant is provided with a drain passageway from the interior of the barrel above the main hydrant valve to the exterior of the valve. A first valve means, which is automatically opened or closed by actuation of the main hydrant valve element, is arranged to close the drain passageway when the main hydrant valve element is open and to open the drain passageway when the main hydrant valve element is closed. A pressure responsive one-way check valve in series with the valve means in said drain passage is automatically actuated to open position by pressure of water when there is water in the hydrant barrel and the valve means in series therewith in the drain passageway is open. The one-way check valve automatically closes when the barrel is dry and prevents ingress of water and dirt, grit or other foreign matter from the exterior of each to the interior, thereby protecting the main hydrant valve and its associated operating mechanism.

21 Claims, 10 Drawing Figures

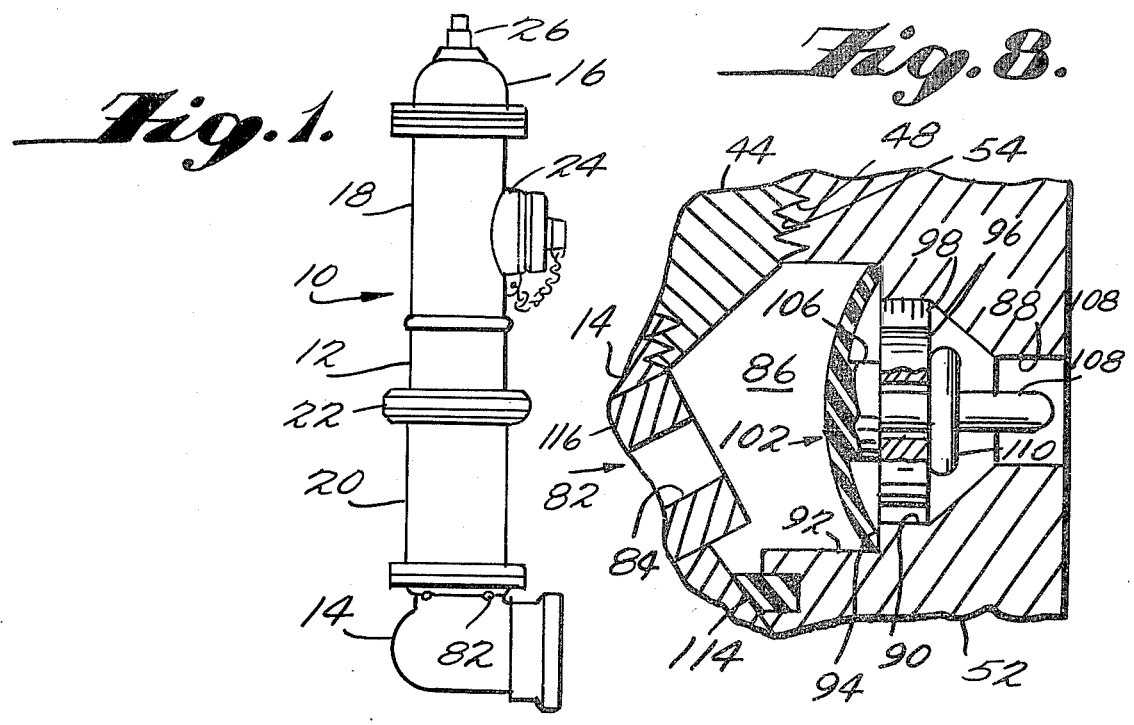
Fig. 1.
Fig. 8.
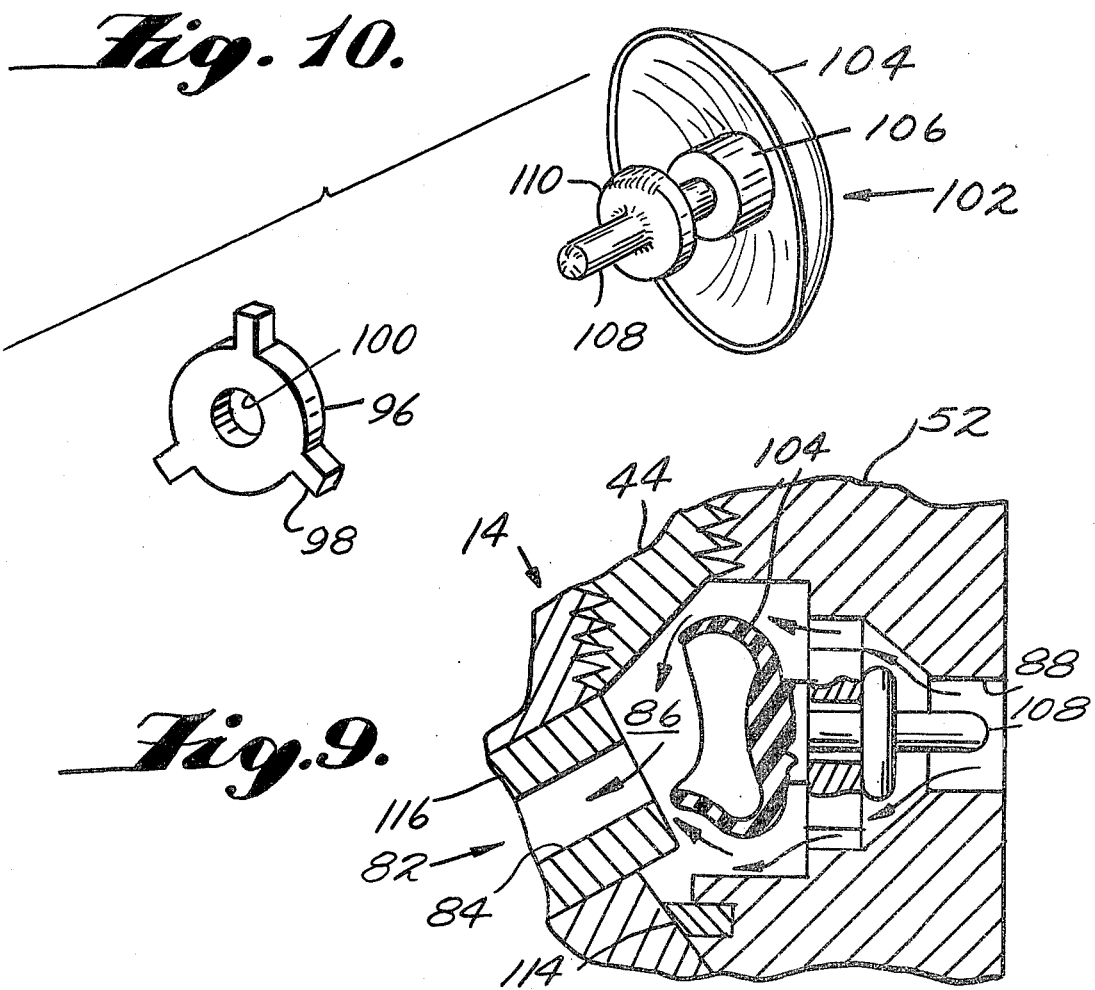
Fig. 10.
Fig. 9.

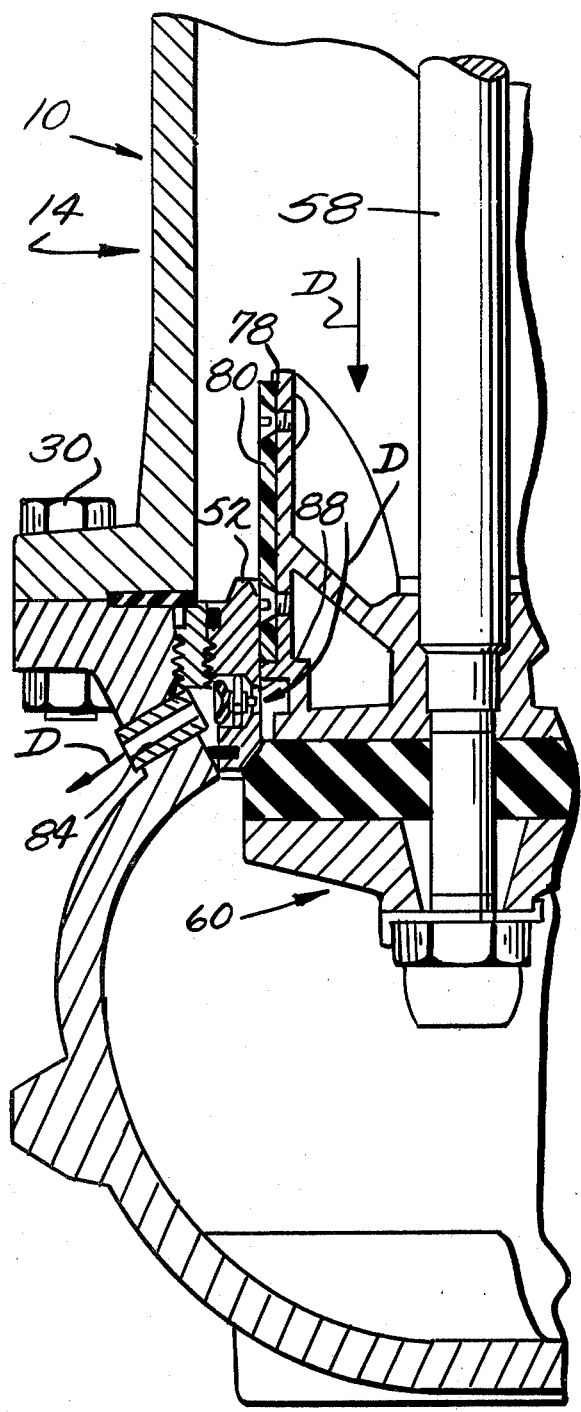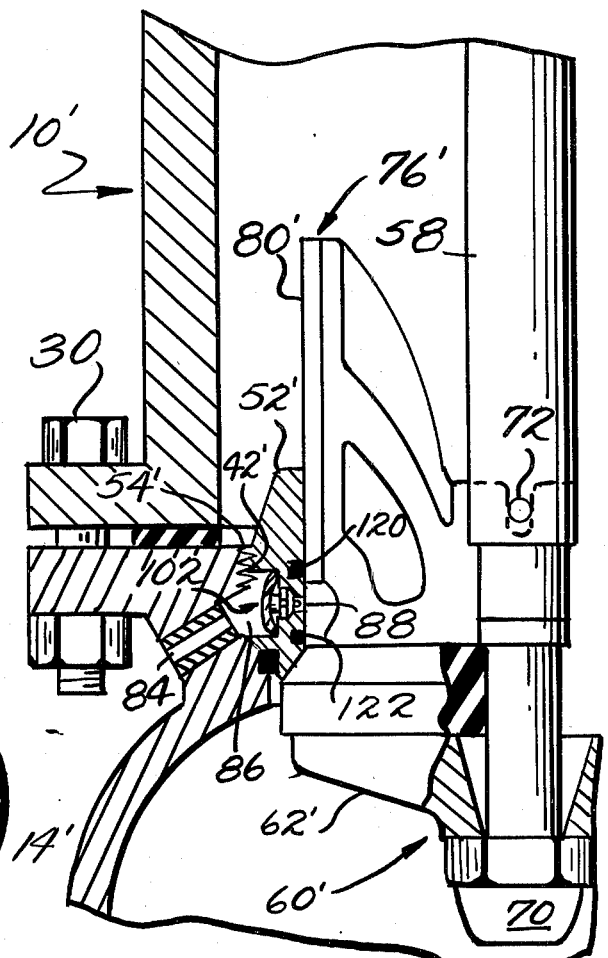

FIRE HYDRANT WITH DRAIN VALVE AND BACKFLOW PREVENTER MECHANISM

The present invention relates to improvements in fire hydrants and, more particularly, to an arrangement of a dry barrel fire hydrant wherein water is drained from the barrel to the exterior of the hydrant after each use of the hydrant. The improved hydrant construction prevents water with dirt, grit or other foreign matter from entering from the exterior of the hydrant to the interior of the hydrant at all times and especially when the drain valve is open and the hydrant barrel is dry, thus protecting the main hydrant valve and its associated operating mechanism.

BACKGROUND OF THE INVENTION

There are two basic types of fire hydrants manufactured today and these types are commonly referred to in the trade as the "wet" barrel or "California" fire hydrant and the dry barrel fire hydrant. The wet barrel type of fire hydrant is a hydrant wherein the main hydrant valve is located in the hydrant barrel adjacent the outlet or hose connection for the same and, in situations where there is more than one outlet or hose connection, there is a main hydrant valve for each. This type of hydrant is used in mild climates, such as the southern states of the United States and Hawaii, where there is no chance of freezing. The more prevalent used fire hydrant is of the dry barrel type wherein the hydrant is provided with a single main hydrant valve positioned deep underground below the freeze line to prevent freezing of the hydrant in winter weather.

Since the dry barrel hydrant has its main hydrant valve positioned in the area of the hydrant shoe and the lower end of the barrel below the freeze line, means have been provided for draining the barrel above the main hydrant valve after each use of the fire hydrant so as to maintain the hydrant barrel dry at all times during non-use. These prior means for draining the hydrant barrel have been automatic functioning drain valves designed to work in conjunction with the operation of the main hydrant valve so that a drain passageway from the interior of the barrel to the exterior of the hydrant is either open, when the main hydrant valve is closed, or closed, when the main hydrant valve is open. The drain valves may either be a force-flushing design or a non-force-flushing design, and when they are a force-flushing design, they are open momentarily as the main hydrant begins to open or just before the main hydrant valve closes so that full main pressure is applied to the drain passageway to clear the same before its next use.

Prior construction of drain valves for fire hydrants has been of the slide valve type, the spring loaded valve type, the sliding tube type, the cam operated to open and/or closed type or the like. Probably the most predominantly used type of drain valve is the slide valve type wherein a web-like structure having at least one longitudinal rib is carried by the main hydrant valve, the rib being provided with a resilient drain valve facing strip and arranged to cover or uncover the opening of the drain passageway to the interior of the valve seat ring above the main valve seat. For years the drain valve facing strip has been leather, but more recently rubber has been used and, even more recently, as disclosed in the co-pending application of Daniel A. Ellis and Joseph L. Daghe, Ser. No. 600,192 filed July 29, 1975 and entitled FIRE HYDRANT and assigned to the same assignee plastic drain valve strips such as polyethylene have been used.

In substantially all of the dry barrel hydrants, the automatic functioning drain valves are operated so that the drain passageway either provides communication between the exterior of the hydrant and the interior of the barrel or is closed and, further, the passageway remains open for draining purposes at all times the main hydrant valve is closed. Consequently, when a hydrant is located in an area that is damp or subject to being damp during certain periods of time or an area where the water table might rise at times above the position of the main hydrant valve in the hydrant, there is the opportunity of contaminated water or water with dirt, grit and other foreign matter backflowing into the hydrant valve where it may cause damage to the main hydrant valve mechanism or corrosion to the interior parts of the hydrant. Also in this construction, there is danger from subsequent freezing if the backflow pressure is sufficient to raise the water level in the barrel above the freezing line.

Many years ago an effort was made to solve the problem of backflow of water through the drain passageway into the barrel of a dry barrel fire hydrant and in this respect, a completely independent backflow preventer valve was installed in the drain passageway in series with a drain valve actuated by the fire hydrant's main valve. In this respect, the backflow preventer valve was a manually operable valve and it required utilizing a separate shaft extending from the backflow preventer valve element through the barrel, the shaft cooperating with a separate operating nut positioned on the bonnet of the fire hydrant. Thus, for the drain valve system of such a fire hydrant to operate successfully, it was necessary each time the fire hydrant was used to separately operate the operating nut for the main hydrant valve which in turn operated the drain valve and the operating nut to operate the backflow preventer valve. In more detail, when the fire hydrant was used, and the main hydrant valve was opened, it would close the drain valve so as to close the drain passage to the exterior of the hydrant. After the main hydrant valve was closed, thus, opening the drain valve, it was necessary to separately operate the backflow preventer valve to open the same so that the drain passage would be opened to the exterior. However, it does take considerable time for water to drain from the barrel to the exterior of the fire hydrant when the drain passageway had been freely opened, so therefore it required someone returning to the hydrant at a later time to close off the backflow preventer valve so as to prevent backflow of ground water into the barrel. Since the rate of flow of the drain water could vary due to different conditions of the ground surrounding the outlet of the drain passageway, sometimes the manually controlled backflow preventer valve was closed prior to full drainage of the hydrant barrel. In other instances careless operators failed to return and manually close the backflow preventer valve and therefore, the fire hydrant was subjected to the problem of backflow of ground water. Since such an arrangement required careful operation on the part of the operator as well as considerably more mechanism to be incorporated in the fire hydrant which would increase the cost of the same without insuring "fail proof" operation, this type of hydrant was never widely accepted and, as mentioned above, the predominant number of dry barrel fire hydrants commercially used today merely use a drain valve which automatically functions to operate in conjunction with the operation of the main hydrant valve and, thus, the hydrants are not protected from the backflow of ground water.

PRIOR ART

Prior art relating to fire hydrants having different types of drain valves operable in conjunction with the main hydrant valve and having a manually operable backflow preventer valve are as follows:

| NUMBER    | NAME          | DATE            |
|-----------|---------------|-----------------|
| 242,243   | ADAMS         | May 31, 1881    |
| 1,021,537 | LAWNIN        | March 26, 1912  |
| 1,083,291 | MILLER ET AL. | January 6, 1914 |
| 2,555,727 | BOLSER        | June 5, 1951    |
| 3,185,171 | MUELLER ET AL.| May 25, 1965    |
| 3,506,027 | DUNTON        | April 14, 1970  |

BRIEF SUMMARY OF THE INVENTION

Broadly stated the present invention relates to an improvement in a fire hydrant and, more particularly, to the improved arrangement for providing a drain passageway opening at one end to the exterior of the hydrant and at the other end to the interior of the hydrant barrel at a position above the main hydrant valve stem, the arrangement including drain valve means operatively connected to and actuated by the valve stem and main valve element for opening and closing the drain passageway coupled with a pressure responsive one-way check valve in series therewith and which operates in conjunction with the drain valve to open and permit draining of water from the barrel and closes automatically when the hydrant barrel is dry to prevent backflow of ground water from the exterior of the fire hydrant to the interior of the hydrant barrel.

The arrangement described above requires no special attention on the part of the operator as the entire drain system for the fire hydrant is completely automatic for draining and preventing backflow of ground water, this operation being in conjunction with the operation of the fire hydrant to open and close the same. The system is so arranged that the drain passageway is flushed out when the main hydrant valve begins to open and is again flushed out when the main hydrant valve is almost closed and, consequently, there need be no concern for the drain system becoming inoperative due to clogging or corrosion of the passageway.

The invention further contemplates a fire hydrant utilizing a valve seat ring removably supported adjacent the connection of the hydrant barrel and the hydrant shoe. The valve seat ring is provided with a portion of the drain passageway that opens to the interior of the barrel at a position above the main hydrant valve seat. The pressure responsive one-way check valve for preventing backflow of ground water is also carried in the portion of the drain passageway in the valve seat ring and thus if it is necessary to inspect the one-way check valve or replace the same, it may be easily accomplished by merely removing the valve seat ring from the hydrant thus eliminating the digging up of the hydrant and the shoe and disassembly of the same to replace the check valve.

The pressure responsive one-way check valve is a one-piece unit held in a spider provided in the drain passage of the valve seat ring, thus, eliminating moving parts. It is made of an elastomeric material such as rubber or a rubber-like material and is not subject to corrosion. The pressure necessary to operate the same to the open position may be very slight but any pressure acting in the reverse direction whether small or large tends to close the valve tighter than the normal resiliency of the valve causing the same to return to its relaxed closed position. Such a pressure responsive one-way check valve is preferably used in combination with slide valve means, the slide valve means including a web structure having a longitudinal rib and carried on the main hydrant valve element and its valve stem, the longitudinal rib having a drain valve facing strip arranged to slide over and close the opening of the passage in the valve seat ring.

BRIEF DESCRIPTION OF THE DRAWINGS

FIG. 1 is a side elevational view of a fire hydrant embodying the present invention, the fire hydrant including a hydrant barrel and a hydrant shoe.

FIG. 5 is a fragmentary vertical sectional view similar to FIG. 2 but the view represents the fire hydrant just after the main hydrant valve has been closed and illustrating water draining from the interior of the hydrant barrel to the exterior of the hydrant.

FIG. 6 is a fragmentary vertical sectional view similar to FIG. 2 but illustrating a modified valve seat ring arrangement and a modified form of slide drain valve.

FIG. 7 is a fragmentary vertical sectional view through the drain system of a fire hydrant the view illustrating a further modified valve seat ring construction and means for supporting the same.

FIG. 8 is an enlarged vertical sectional view through the pressure responsive one-way check valve for preventing backflow, the view illustrating the valve in the closed position.

FIG. 9 is a fragmentary sectional vertical view similar to FIG. 8 but illustrating the one-way check valve being opened by the pressure of water within the barrel.

FIG. 10 is a perspective view of the one-way check valve element and the spider for retaining the element in the drain passage of the valve seat ring.

DETAILED DESCRIPTION OF THE INVENTION

Figure 2:
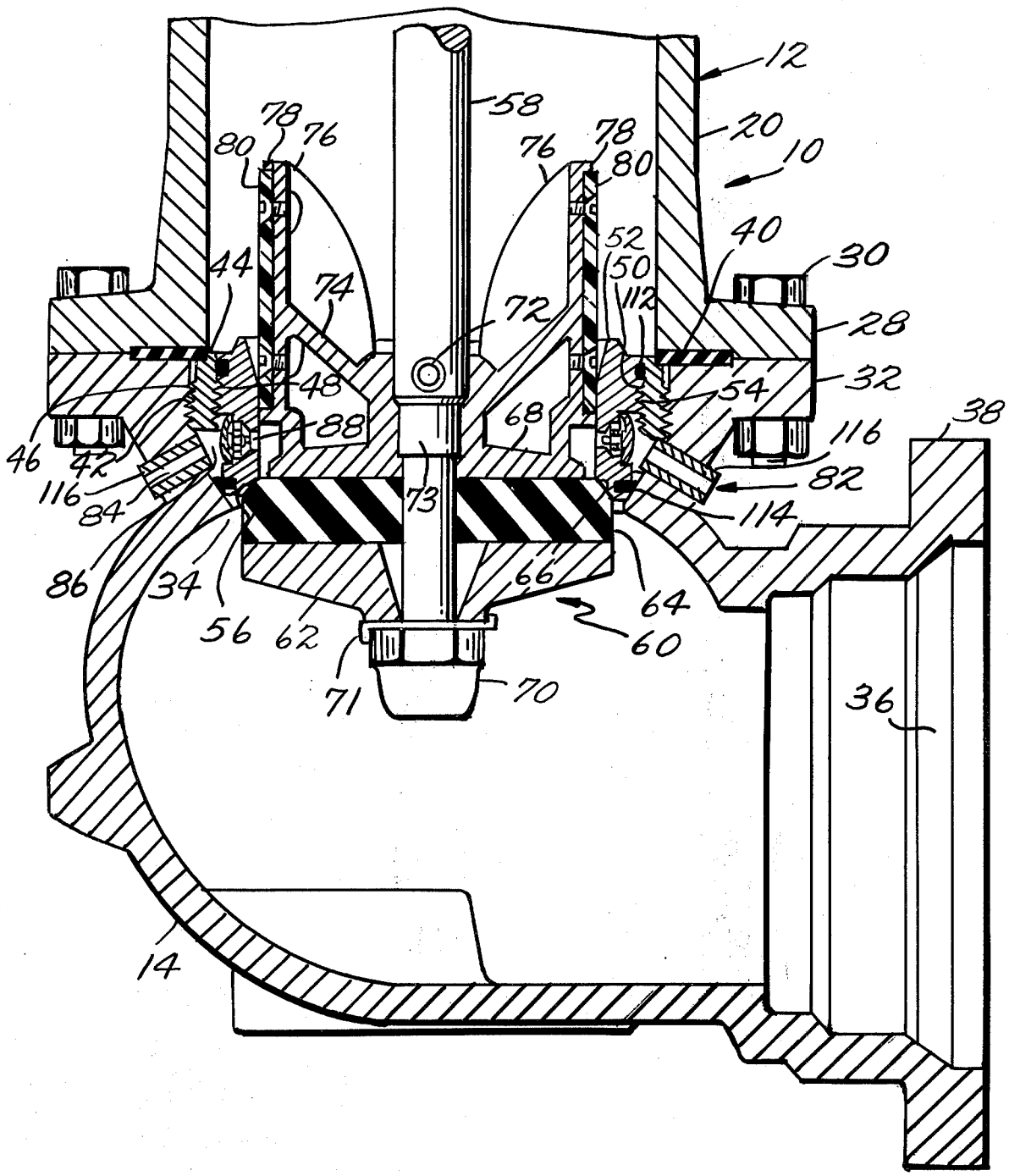
FIG. 2 is an enlarged fragmentary vertical sectional view of the lower portion of the fire hydrant of FIG. 1, the view illustrating the present invention in a fire hydrant having a main valve element opened downwardly against water main pressure, certain portions of the main hydrant valve being shown in elevation for purpose of clarity.

Referring now to the drawings wherein like characters and reference numerals represent like and similar parts, there is disclosed in FIG. 1 a fire hydrant generally designated at 10 and having a barrel 12, a shoe 14, a bonnet section 16. The barrel 12 is usually made in two sections, an upper section 18 and a lower section 20 connected thereto by a frangible coupling 22. One or more nozzle outlets 24 are provided on the upper barrel section 18 to which a hose (not shown) may be connected. The main hydrant valve is operated by an operating nut 26 projecting outwardly of the bonnet 16 and operatively connected to the reciprocating valve stem of the hydrant to be described later.

Referring now to FIGS. 2 through 5 inclusive and FIGS. 8 through 10 inclusive, the lower section 20 of the barrel 12 is provided with a flanged end 28 arranged to be bolted by bolt means 30 to the flanged end 32 surrounding an upwardly opening mouth 34 of the hydrant shoe 14. The hydrant shoe 14 is provided with an inlet end 36 having a flange 38 surrounding the same for attachment to a water main (not shown). A gasket or sealing means 40 is provided between the flanged end 28 of the lower barrel section 20 and the flanged end 32 of the shoe 14.

The upwardly opening mouth 34 of the hydrant shoe 14 is interiorly threaded as indicated at 42 for receiving an annular brass ring 44 having exterior threads 46 and interior threads 42 of the cast iron shoe 14. The interior threads 48 of the annular brass ring 44 extend only a portion of the length of the bore of the ring with the remaining portion 50 being unthreaded. The annular brass ring 44 is arranged to support a brass hydrant valve seat ring 52 which is exteriorly threaded as indicated at 54 and is received in the threads 48 of the annular ring 44 which supports the same. The hydrant valve seat ring 52 is provided with a downwardly facing frusto-conical main hydrant valve seat 56.

As shown in FIG. 2 a valve stem 58 extends downwardly through the barrel 12 and is operatively connected at its upper end to the operating nut 26 so that rotation of the nut 26 causes the valve stem 58 to reciprocate vertically. As is the usual practice, the valve stem 58 is made in two sections connected together by a frangible coupling (not shown) positioned adjacent the frangible coupling 22 connecting the upper and lower sections 18 and 20 respectively of the barrel.

Attached to the lower end of the valve stem 58 for vertical reciprocation therewith is a main hydrant valve member generally designated at 60, the main hydrant valve member being arranged to cooperate with the main hydrant valve seat 56. In more detail the main hydrant valve member 60 includes a lower valve plate 62, a rubber or rubber-like valve element 64 having a frusto-conical seat 66 and an upper valve plate 68. A cap nut 70, locked in position by a lock washer 71, retains the lower valve plate 62, upper valve plate 68 on the lower end of the stem 58 with the valve element 64 sandwiched therebetween as a stem pin 72 coupled with the reduced end portion 74 of the valve stem 58 prevents the upper valve plate from moving upwardly on the valve stem. The upper valve plate 68 includes a web-like structure 74 carrying a pair of longitudinally and upwardly extending ribs 76. The ribs 76 ride in longitudinal grooves provided in the valve seat ring 52 and the ribs 76 are also provided with longitudinally extending slots 78 which receive drain valve facing strips 80. The drain valve facing strips 80 may be leather, rubber, or a plastic material such as polyethylene as disclosed in the aforementioned ELLIS et al. application, Ser. No. 600,192 filed July 29, 1975. For the purpose of this disclosure, the ELLIS et al. application is incorporated herein by reference.

A drain passageway generally indicated at 82 is provided in the shoe 14 and the hydrant seat ring, the drain passageway opening at one end to the exterior of the hydrant 10 and at the other end to the interior of the barrel 12 above the main hydrant valve seat 56. There may be one or more of these drain passageways 82 in the hydrant and as shown in FIG. 2 there are two. The drain passageway 82 includes a short drain passageway 84 through the shoe 14, an annular space or circumferential groove 86 between the shoe and the lower portion of the valve seat ring 52 and a drain passage 88 extending through the valve seat ring 52. Although in the drawings, it appears that the drain passage 88 in the valve seat ring 52 and the drain passageway 84 in the shoe 14 are aligned, they do not have to be oriented in any angular manner with each other because they both open to the circumferential groove 86. The drain valve facing strip 80 carried by the main hydrant valve member 60 is arranged to cooperate with the drain passage 88, thus providing a drain valve arranged to close the passageway 82 when the main valve member 60 is open and to open the passageway 82 when the main hydrant valve is closed.

Referring specifically to FIGS. 8, 9 and 10 it will be noted that the outer end of drain passage 88 flares outwardly into a first counterbore 90 in the valve seat ring 52 and a second counterbore 92 is provided outwardly of the counterbore 90 so as to define an annular outwardly facing wall or seating surface 94. A spider element 96 having arcuately spaced radially extending legs 98 and a center aperture 100 is press fit into the counterbore 92, the spider element being made of a relatively rigid plastic material or metal. A flexible resilient pressure-responsive one-way check valve generally indicated at 102 is carried by the spider element 96 and is arranged to cooperate with the annular outwardly facing wall or seating surface 94. In more detail the pressure-responsive valve element 102 includes a thin flexible disk member 104 which is umbrella-shaped or semi-spherical shaped, the disk member 104 being provided with a centrally positioned boss 106 extending from its inner surface and a stem 108. The stem 108 is provided with an annular enlargement 110 spaced from the boss 106. As is shown in FIGS. 8 and 9 the stem 108 is inserted through the aperture 100 of the spider element 96 along with the annular enlargement 110 so that the annular enlargement 110 and the boss 106 lock the valve element 102 in place. The pressure-responsive one-way check valve 102 is made of an elastomeric material such as rubber or a rubber-like substitute.

As will be noted from FIG. 2, a sealing ring 112 is positioned in a groove provided on the unthreaded exterior portion of the valve seat ring 52 for sealing with the annular support ring 44. The sealing ring 112, which may be an O-ring, is above the drain passageway 82. A second gasket 114 is provided between the valve seat ring 52 and the mouth 34 of the shoe 14 below the drain passageway 82. Additionally, it will be noted that the drain passageway 84 in the shoe is provided with a drain tube 116, the drain tube 116 being made of brass or bronze or other non-corrodible material.

Figure 3:
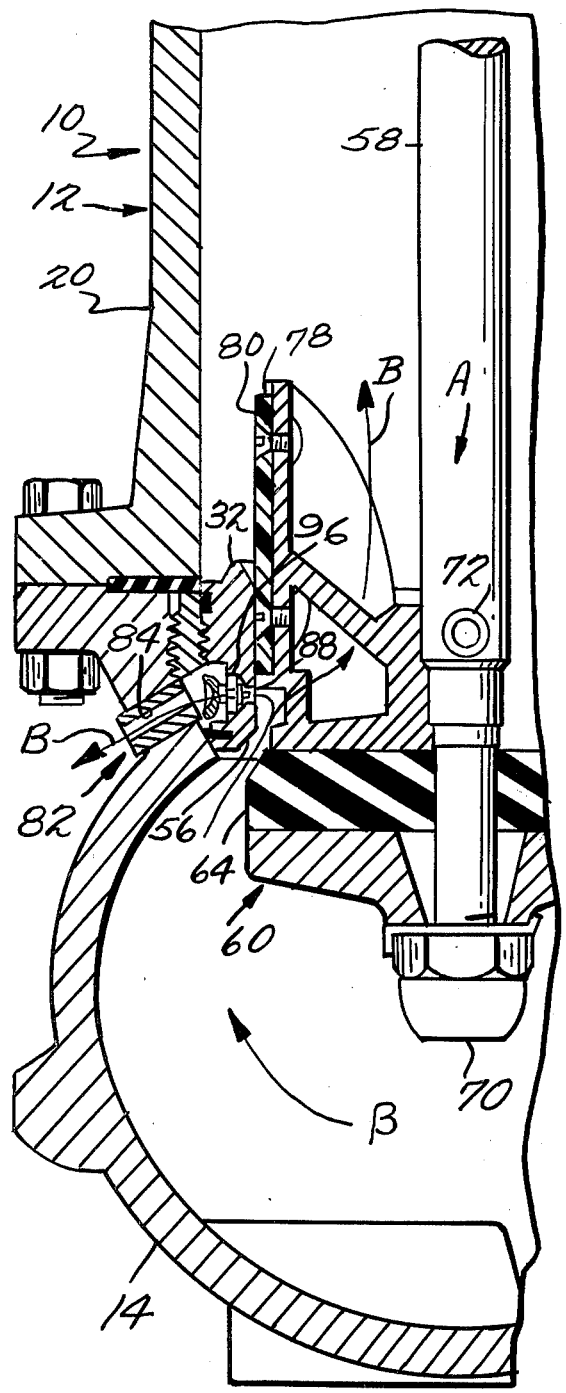
FIG. 3 is a fragmentary vertical sectional view similar to FIG. 2 but illustrating the main hydrant valve being cracked open and showing the flow of water through the main hydrant valve into the hydrant barrel and through the drain passageway for purging the same.

Referring now to FIG. 3, the view illustrates the fire hydrant 10 of the present invention having its valve member 60 beginning to open off of the main hydrant seat 56 as the stem 58 moves the same downwardly in the direction of the arrow A. Water from the water main (not shown) flows through the hydrant shoe 14 and through the cracked opening between the valve element 64 and the main hydrant valve seat 56 under full pressure. When in this position the drain valve facing strip 80 has not covered the opening of the drain passage 88 in the valve seat ring 52 and consequently water under main pressure flows not only into the barrel 12 but also into the drain passage 88 under water main pressure, then through the spider element 96 opening the one-way pressure-responsive check valve 102 (FIG. 9) and from there the water under this full pressure flows through the drain passageway 84 to the exterior of the hydrant 10. If there is any dirt or debris in the passageway 84 of the shoe 14 or for that matter the passage 88, this dirt or debris will be blown out of the passageway so that the passageway is purged clean for subsequent draining of the hydrant barrel 12 when the hydrant is turned off. The arrows B represent the flow of water in this condition of operation.

Figure 4:
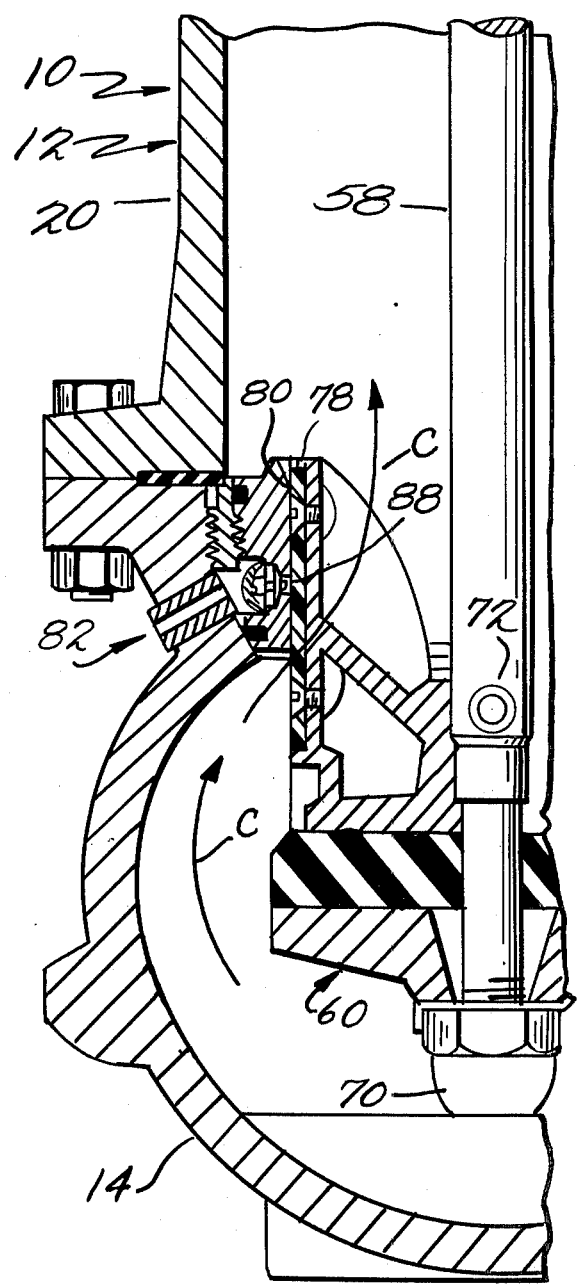
FIG. 4 is a fragmentary vertical sectional view similar to FIG. 3 but illustrating the main hydrant valve in the fully open position with the drain valve closed and with the flow of water into the hydrant barrel only.

Referring to FIG. 4, the main hydrant valve 60 of the hydrant 10 is shown in the full open position with water under main pressure flowing through the shoe unobstructed into the barrel 12. It will be noted that the drain valve facing strip 80 has covered the drain passage 88 so that the drain passageway 82 is closed to the exterior of the hydrant. The umbrella-shaped disk 104 of the pressure-responsive one-way check valve 102 has returned to its normal relaxed and closed position since pressure on the same has been relieved. The arrows C represent the flow of water through the hydrant in the condition of operation.

Referring now to FIG. 5, which is a view somewhat similar to FIG. 2, but which discloses the main hydrant valve 60 in the closed position just after the hydrant had been used, the barrel 14 will be filled with water that must be drained therefrom to protect the hydrant during freezing weather. In this position of operation, the drain valve facing strip 80 has moved out of engagement with the drain passage 88 in the valve seat ring 52 and the water flows in and through the drain passage 88 to open the pressure-responsive one-way check valve 102. Water then drains through the drain passageway 84 to the exterior of the hydrant and when the barrel is empty, the pressure-responsive one-way check valve 102 will automatically close to prevent the back-flow of water from the exterior of the hydrant to enter into the hydrant barrel 14 where it could damage the seating surfaces of the various valves. It takes very little hydrostatic pressure on the back surface of the flexible disk 104 to open the pressure-responsive one-way check valve 102 and once this pressure has dissipated by the draining of the barrel 14 the flexible disk 104 of the pressure-responsive one-way check valve 102 will return to its relaxed position to close the passageway 88 from the exterior of the hydrant. Any back-flow pressure from the exterior of the hydrant will tend to keep the valve 102 in its closed position. The arrows D represent the draining of water from the interior to the exterior of the hydrant.

Referring now to FIG. 6 there is disclosed a modification of the hydrant shown in FIGS. 1–5 and this modification relates to the means for removably supporting the valve seat ring 52' in the shoe 14' as well as the drain valve construction. In more detail, instead of providing the brass annular ring 44 for supporting the brass valve seat ring 52, the hydrant shoe 14' is provided with interior threads 42' for directly receiving the exterior threads 54' of the hydrant valve seat ring 52'. In this modification the brass hydrant seat ring 52' is threaded directly into the cast iron shoe 14'. The valve seat ring 52' is provided with an endless groove 120 extending about the opening of the drain passage 88 to the interior of the barrel 14, the groove 120 receiving an O-ring seal 122. Instead of providing drain valve facing strips 80 on longitudinally extending ribs 76, the ribs 76' have a machined surface 80' which cooperates with the O-ring 122 when the main hydrant valve member 60' is open so as to seal off the drain passage 88 from the exterior of the hydrant. This structure for the drain valve of hydrant 10' is similar to that disclosed in U.S. Pat. No. 3,185,171 issued May 25, 1965 to Frank H. Mueller and John J. Smith and assigned to the same assignee, and to this extent the subject matter of this Patent is incorporated by reference.

Referring now to FIG. 7 there is disclosed a further modification of the hydrant and in this modification the means for supporting the hydrant valve seat ring 52'' is identical to that disclosed in the aforementioned ELLIS et al. application Ser. No. 600,192 filed July 29, 1975 and to this extent the subject matter of this application is incorporated by reference. In more detail, the lower barrel section 20'' and the hydrant shoe 14'' are bolted to each other with an annular housing member 130 sandwiched therebetween and bolted to the shoe 14'' only. The housing member 130 which supports the valve seat ring 52'' includes an annular housing ring 132 and an annular drain ring 134. The annular drain ring 134 is provided with interior threads 136 for receiving the exterior threads 138 of the valve seat ring 52''. By such an arrangement the valve seat ring 52'' is threaded into a brass member, namely, the annular drain ring 134'.

In each of the various arrangements shown by the preferred arrangement and the modifications described above, it will be noted that the valve seat ring which carries the pressure-responsive one-way check valve can be removed from the hydrant so that if it is necessary to inspect and/or replace the pressure-responsive one-way check valve, this can be easily accomplished. The invention requires no special manual effort on the part of the operator of the hydrant to insure that the hydrant barrel is properly drained after each use as the draining of the hydrant barrel and the subsequent closing of the drain passageway is completely automatic with the operation of the hydrant.

The terminology used in this specification is for the purpose of description and not limitation as the scope of the invention is described by the claims.

What is claimed is:
1. In a fire hydrant, the combination comprising:
 a hydrant barrel having a lower flanged end;
 a hydrant shoe having an upwardly-opening mouth surrounded by a flanged end, the flanged end of said hydrant shoe being operatively connected to the lower flanged end of said hydrant barrel;
 a valve seat ring having a main hydrant valve seat and at least one drain passage having an inner and an outer end and extending through said valve seat ring and opening above said main hydrant valve seat;
 means removably supporting said valve seat ring adjacent the connection of the hydrant barrel and the hydrant shoe;
 means defining a circumferential groove between the periphery of said valve seat ring and said means for supporting the same, said drain passage of said valve seat ring opening to said circumferential groove;
 at least one drain passageway opening at one end to said circumferential groove and at the other end to the exterior of the hydrant;

a reciprocating valve stem carrying a main hydrant valve element for seating and unseating cooperation with said main valve seat;

valve means operatively connected to and actuated by said valve stem and said main valve element for opening and closing the drain passage in said valve seat, said valve means opening said drain passage when said main valve element is seated whereby water in said barrel may drain to the exterior of said hydrant and closing said drain passage when said main valve element is at least fully unseated; and, a pressure responsive one-way check valve removably mounted in said drain passage of said valve seat ring, said check valve being arranged to open when there is water in said hydrant barrel and said first mentioned valve means is open and being arranged to close when said barrel is dry to thereby prevent backflow of water from the exterior to the interior of said barrel and said one-way check valve being removable with removal of said seat ring without necessity of removal of said shoe.

2. A fire hydrant as claimed in claim 1 in which said drain passage in said valve seat ring is provided with a counterbore in its outer end and in which said pressure responsive one-way check valve is a flexible disk member normally seated in said counterbore to close said drain passage when said barrel is dry and prevent water from the exterior of said hydrant entering the interior thereof.

3. In a fire hydrant, a combination comprising:

a hydrant barrel having a lower flanged end;

a hydrant shoe having an upwardly-opening mouth surrounded by a flanged end, the flanged end of said hydrant shoe being operatively connected to the lower flanged end of said hydrant barrel;

a valve seat ring having a main hydrant valve seat and at least one drain passage having an inner and outer end and extending through said valve seat ring and opening above said main hydrant valve seat, said drain passage in said valve seat ring being provided with a counterbore at its outer end;

means removably supporting said valve seat ring adjacent the connection of the hydrant barrel and the hydrant shoe;

means defining a circumferential groove between the periphery of said valve seat ring and said means for supporting the same, said drain passage of said valve seat ring opening to said circumferential groove;

at least one drain passageway opening at one end to said circumferential groove and at the other end to the exterior of the hydrant;

a reciprocating valve stem carrying a main hydrant valve element for seating and unseating cooperation with said main valve seat;

valve means operatively connected to and actuated by said valve stem and said main valve element for opening and closing the drain passage in said valve seat, said valve means opening said drain passage when said main valve element is seated whereby water in said barrel may drain to the exterior of said hydrant and closing said drain passage when said main valve element is at least fully unseated; and, a pressure responsive one-way check valve in said drain passage of said valve seat ring, said check valve being arranged to open when there is water in said hydrant barrel and said first mentioned valve means is open and being arranged to close when said barrel is dry to thereby prevent backflow of water from the exterior to the interior of said barrel, and said pressure responsive one-way check valve including a spider element carried in said drain passage and having a center aperture therethrough and a flexible disk-shaped valve element seatable in said counterbore, said disk-shaped element having a stem extending through the aperture in said spider element and having an abutment ring thereon for retaining the same in place.

4. A fire hydrant as claimed in claim 3 in which said flexible disk-shaped element is umbrella-shaped.

5. A fire hydrant as claimed in claim 4 in which said disk-shaped element is made of an elastomeric material.

6. A fire hydrant as claimed in claim 5 in which said spider element has an interference fit in said drain passage.

7. A fire hydrant as claimed in claim 3 in which said valve means operatively connected to and actuated by said valve stem and said main valve element includes slide valve means carried by said valve stem and said main valve element for cooperation with the inner end of said drain passage in said drain ring.

8. A fire hydrant as claimed in claim 7 in which said slide valve means includes a longitudinally extending rib carried on said main valve element, said rib having a resilient drain valve facing strip carried thereon and arranged to close the inner end of the drain passage in said valve seat ring when said main valve element is in the open position and to open said drain passage in the valve seat ring when said main valve element is in the closed position whereby the hydrant barrel can be drained of water through the drain passage in said valve seat ring and through the pressure responsive one-way check valve to the exterior of the hydrant through said drain passageway.

9. A fire hydrant as claimed in claim 7 including means defining a circular groove in said valve seat ring surrounding the inner end of said drain passage, an O-ring in said groove for sealing engagement with said slide valve means when said main valve element is in the closed position.

10. A fire hydrant as claimed in claim 9 in which said slide valve means includes a longitudinally extending rib carried on said main valve element and having a surface on the same for cooperating with O-ring to close said drain passage when said main valve element is in the closed position.

11. A fire hydrant as claimed in claim 7 in which said support means for said valve seat ring includes a housing ring having interior and exterior threads, said upwardly opening mouth of said shoe being interiorly threaded to receive said housing ring and said valve seat ring being externally threaded to be received in the interior threads of said housing ring.

12. A fire hydrant as claimed in claim 7 in which said housing ring and said valve seat ring are brass and in which said drain passageway to the exterior of said hydrant is in said shoe and includes a non-corrodible drain tube.

13. A fire hydrant as claimed in claim 7 in which said support means for removably supporting said valve seat ring includes interior threads in the mouth of said shoe and exterior threads on said valve seat ring and in which said drain passageway to the exterior of the hydrant is located in said shoe.

14. A fire hydrant as claimed in claim 7 in which said support means for removably supporting said valve seat ring includes an annular housing member sandwiched between the flanged lower end of said barrel and said flanged end of said shoe, said annular housing member having interior threads and in which said valve seat ring has exterior threads received in the interior threads of said housing member.

15. A fire hydrant as claimed in claim 14 in which said drain passageway to the exterior of said hydrant is located in said annular housing member.

16. A fire hydrant as claimed in claim 15 in which said annular housing member includes an annular housing ring sandwiched between the flanged end of said shoe and the flanged lower end of said barrel, said housing ring having a radial inwardly extending flange, an annular drain ring positioned between the radial inwardly extending flange of the housing ring and the hydrant shoe, said drain ring including the drain passageway to the exterior of the hydrant shoe and having the interior threads of the housing member for cooperation with the exterior threads of the valve seat ring.

17. A fire hydrant as claimed in claim 16 in which said annular drain ring and said valve seat ring are each made of brass.

18. A fire hydrant as claimed in claim 16 in which said main hydrant valve seat faces downwardly.

19. A fire hydrant as claimed in claim 1 in which said main hydrant valve seat is downwardly facing.

20. In a fire hydrant, the combination comprising:
a hydrant barrel;
a hydrant shoe operatively connected to the lower end of said hydrant barrel;
a valve seat ring having a main hydrant valve seat, said valve seat ring being removably supported adjacent the connection of the hydrant barrel to the hydrant shoe;
means defining a drain passageway opening at one end to the exterior of the hydrant and at the other end to the interior of the hydrant barrel at a position above said main hydrant valve seat;
a reciprocating valve stem carrying a main hydrant valve element for seating and unseating cooperation with said main valve seat;
valve means operatively connected to and actuated by said valve stem and said main valve element for opening and closing said drain passageway, said valve means opening said drain passageway when said main valve element is seated whereby water in said barrel may drain to the exterior of said hydrant and closing said passageway when said main valve element is at least fully unseated; and,
a pressure responsive one-way check valve in said drain passageway in series with said valve means, said check valve being removably supported in said valve seat ring and removable with removal of said valve seat ring without necessity of removal of said shoe, said check valve being closer to the opening of said drain passageway to the exterior of the hydrant than said valve means and being arranged to open when there is water in said hydrant barrel and said first mentioned valve means is open and being arranged to close when said barrel is dry to thereby prevent backflow of water from the exterior to the interior of said barrel.

21. A fire hydrant as claimed in claim 20 in which said valve means is a slide valve arranged to open and close the opening of said drain passageway to the interior of said barrel and in which said one-way check valve is a flexible disk-shaped umbrella valve arranged to open from the pressure of water in said barrel when said main valve element is closed and arranged to automatically close when said barrel is dry to thereby prevent backflow of water from the exterior of the hydrant to the interior of the barrel.

* * * * *